US 8,547,831 B2

(12) United States Patent
Taylor et al.

(10) Patent No.: US 8,547,831 B2
(45) Date of Patent: *Oct. 1, 2013

(54) METHODS AND SYSTEMS FOR AUTOMATICALLY REROUTING LOGICAL CIRCUIT DATA

(71) Applicant: AT&T Intellectual Property I, L.P., Atlanta, GA (US)

(72) Inventors: William Taylor, Duluth, GA (US); David Massengill, Covington, GA (US); John Hollingsworth, Covington, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,777

(22) Filed: Nov. 30, 2012

(65) Prior Publication Data

US 2013/0091377 A1 Apr. 11, 2013

Related U.S. Application Data

(63) Continuation of application No. 12/609,415, filed on Oct. 30, 2009, now Pat. No. 8,345,543, which is a continuation of application No. 10/745,168, filed on Dec. 23, 2003, now Pat. No. 7,639,606.

(51) Int. Cl.
*H04B 1/74* (2006.01)
(52) U.S. Cl.
USPC .......................................................... 370/225
(58) Field of Classification Search
CPC ........................................................ H04B 1/74
USPC ........................................................ 370/225
See application file for complete search history.

(56) References Cited

U.S. PATENT DOCUMENTS

| 4,905,233 A | 2/1990 | Cain et al. |
| 5,016,244 A | 5/1991 | Massey, Jr. et al. |
| 5,065,392 A | 11/1991 | Sibbitt et al. |
| 5,241,534 A | 8/1993 | Omuro et al. |

(Continued)

OTHER PUBLICATIONS

United States Patent and Trademark Office, "Non-Final Office Action," issued in connection with U.S. Appl. No. 12/551,477, on Nov. 16, 2010 (15 pages).

(Continued)

*Primary Examiner* — Ricky Ngo
*Assistant Examiner* — Ben H Liu
(74) *Attorney, Agent, or Firm* — Hanley, Flight and Zimmerman, LLC

(57) ABSTRACT

An example involves selecting a logical failover circuit comprising an alternate communication path for communicating data upon a failure of a dedicated logical circuit connecting a host device to a remote device. When a first logical circuit identifier of the dedicated logical circuit does not match a second logical circuit identifier of the logical failover circuit: the second logical circuit identifier of the logical failover circuit is renamed to identify the logical failover circuit using the first logical circuit identifier when the logical failover circuit is a dedicated logical failover circuit used to communicate only when the dedicated logical circuit fails, and the dedicated logical circuit is renamed to identify the dedicated logical circuit using the second logical circuit identifier when the logical failover circuit is used to communicate regardless of the failure of the dedicated logical circuit. The data is rerouted to the logical failover circuit without manual intervention.

20 Claims, 5 Drawing Sheets

(56) References Cited

U.S. PATENT DOCUMENTS

| | | | |
|---|---|---|---|
| 5,265,092 | A | 11/1993 | Soloway et al. |
| 5,375,126 | A | 12/1994 | Wallace |
| 5,408,461 | A | 4/1995 | Uriu et al. |
| 5,539,817 | A | 7/1996 | Wilkes |
| 5,544,170 | A | 8/1996 | Kasahara |
| 5,548,639 | A | 8/1996 | Ogura et al. |
| 5,559,959 | A | 9/1996 | Foglar |
| 5,629,938 | A | 5/1997 | Cerciello et al. |
| 5,633,859 | A | 5/1997 | Jain et al. |
| 5,650,994 | A | 7/1997 | Daley |
| 5,754,527 | A * | 5/1998 | Fujita ............ 370/217 |
| 5,764,626 | A | 6/1998 | VanDervort |
| 5,774,456 | A * | 6/1998 | Ellebracht et al. ........ 370/242 |
| 5,812,528 | A | 9/1998 | VanDervort |
| 5,832,197 | A | 11/1998 | Houji |
| 5,848,055 | A | 12/1998 | Fedyk et al. |
| 5,856,981 | A | 1/1999 | Voelker |
| 5,894,475 | A | 4/1999 | Bruno et al. |
| 5,926,456 | A | 7/1999 | Takano et al. |
| 5,936,939 | A | 8/1999 | Des Jardins et al. |
| 6,028,863 | A | 2/2000 | Sasagawa et al. |
| 6,038,219 | A | 3/2000 | Mawhinney et al. |
| 6,091,951 | A | 7/2000 | Sturniolo et al. |
| 6,104,998 | A | 8/2000 | Galand et al. |
| 6,108,300 | A | 8/2000 | Coile et al. |
| 6,108,307 | A | 8/2000 | McConnell et al. |
| 6,118,763 | A | 9/2000 | Trumbull |
| 6,144,669 | A | 11/2000 | Williams et al. |
| 6,147,998 | A | 11/2000 | Kelley et al. |
| 6,167,025 | A | 12/2000 | Hsing et al. |
| 6,181,675 | B1 | 1/2001 | Miyamoto |
| 6,181,679 | B1 | 1/2001 | Ashton et al. |
| 6,185,695 | B1 | 2/2001 | Murphy et al. |
| 6,195,416 | B1 | 2/2001 | DeCaluwe et al. |
| 6,259,696 | B1 | 7/2001 | Yazaki et al. |
| 6,269,401 | B1 | 7/2001 | Fletcher et al. |
| 6,311,288 | B1 * | 10/2001 | Heeren et al. ............. 714/4.2 |
| 6,360,260 | B1 | 3/2002 | Compliment et al. |
| 6,366,581 | B1 | 4/2002 | Jepsen |
| 6,377,548 | B1 | 4/2002 | Chuah |
| 6,421,722 | B1 | 7/2002 | Bauer et al. |
| 6,424,629 | B1 | 7/2002 | Rubino et al. |
| 6,449,259 | B1 | 9/2002 | Allain et al. |
| 6,456,306 | B1 | 9/2002 | Chin et al. |
| 6,473,398 | B1 | 10/2002 | Wall et al. |
| 6,535,990 | B1 | 3/2003 | Iterum et al. |
| 6,538,987 | B1 | 3/2003 | Cedrone et al. |
| 6,549,533 | B1 | 4/2003 | Campbell |
| 6,553,015 | B1 | 4/2003 | Sato |
| 6,556,659 | B1 | 4/2003 | Bowman-Amuah |
| 6,570,846 | B1 | 5/2003 | Ryoo |
| 6,581,166 | B1 | 6/2003 | Hirst et al. |
| 6,590,899 | B1 | 7/2003 | Thomas et al. |
| 6,594,246 | B1 | 7/2003 | Jorgensen |
| 6,594,268 | B1 | 7/2003 | Aukia et al. |
| 6,597,689 | B1 | 7/2003 | Chiu et al. |
| 6,608,831 | B1 | 8/2003 | Beckstrom et al. |
| 6,625,114 | B1 | 9/2003 | Hassell |
| 6,643,254 | B1 | 11/2003 | Kajitani et al. |
| 6,687,228 | B1 | 2/2004 | Fichou et al. |
| 6,697,329 | B1 | 2/2004 | McAllister et al. |
| 6,711,125 | B1 | 3/2004 | Walrand et al. |
| 6,716,165 | B1 | 4/2004 | Flanders et al. |
| 6,738,459 | B1 | 5/2004 | Johnstone et al. |
| 6,763,476 | B1 | 7/2004 | Dangi et al. |
| 6,766,113 | B1 | 7/2004 | Al-Salameh et al. |
| 6,778,525 | B1 | 8/2004 | Baum et al. |
| 6,781,952 | B2 | 8/2004 | Shirakawa |
| 6,795,393 | B1 | 9/2004 | Mazzurco et al. |
| 6,795,394 | B1 | 9/2004 | Swinkels et al. |
| 6,810,043 | B1 | 10/2004 | Naven et al. |
| 6,823,477 | B1 | 11/2004 | Cheng et al. |
| 6,826,184 | B1 | 11/2004 | Bryenton et al. |
| 6,829,223 | B1 | 12/2004 | Richardson et al. |
| 6,842,513 | B1 | 1/2005 | Androski et al. |
| 6,850,483 | B1 | 2/2005 | Semaan |
| 6,862,351 | B2 | 3/2005 | Taylor |
| 6,865,170 | B1 | 3/2005 | Zendle |
| 6,882,652 | B1 | 4/2005 | Scholtens et al. |
| 6,885,636 | B1 * | 4/2005 | Eve ............................. 370/228 |
| 6,885,678 | B2 | 4/2005 | Curry et al. |
| 6,925,578 | B2 | 8/2005 | Lam et al. |
| 6,952,395 | B1 | 10/2005 | Manoharan et al. |
| 6,973,034 | B1 | 12/2005 | Natarajan et al. |
| 6,973,037 | B1 | 12/2005 | Kahveci |
| 6,978,394 | B1 | 12/2005 | Charny et al. |
| 6,981,039 | B2 | 12/2005 | Cerami et al. |
| 6,983,401 | B2 | 1/2006 | Taylor |
| 6,990,616 | B1 | 1/2006 | Botton-Dascal et al. |
| 7,006,443 | B2 * | 2/2006 | Storr ......................... 370/236.1 |
| 7,012,898 | B1 | 3/2006 | Farris et al. |
| 7,027,053 | B2 | 4/2006 | Berndt et al. |
| 7,035,202 | B2 | 4/2006 | Callon |
| 7,043,250 | B1 | 5/2006 | DeMartino |
| 7,072,331 | B2 | 7/2006 | Liu et al. |
| 7,093,155 | B2 | 8/2006 | Aoki |
| 7,120,148 | B1 | 10/2006 | Batz et al. |
| 7,120,819 | B1 | 10/2006 | Gurer et al. |
| 7,146,000 | B2 | 12/2006 | Hollman et al. |
| 7,165,192 | B1 | 1/2007 | Cadieux et al. |
| 7,184,439 | B1 | 2/2007 | Aubuchon et al. |
| 7,200,148 | B1 | 4/2007 | Taylor et al. |
| 7,209,452 | B2 | 4/2007 | Taylor et al. |
| 7,240,364 | B1 | 7/2007 | Branscomb et al. |
| 7,275,192 | B2 | 9/2007 | Taylor et al. |
| 7,287,083 | B1 | 10/2007 | Nay et al. |
| 7,310,671 | B1 | 12/2007 | Hassell et al. |
| 7,350,099 | B2 | 3/2008 | Taylor et al. |
| 7,391,734 | B2 | 6/2008 | Taylor et al. |
| 7,457,233 | B1 | 11/2008 | Gan et al. |
| 7,460,468 | B2 | 12/2008 | Taylor et al. |
| 7,466,646 | B2 | 12/2008 | Taylor et al. |
| 7,469,282 | B2 | 12/2008 | Taylor et al. |
| 7,483,370 | B1 | 1/2009 | Dayal et al. |
| 7,496,657 | B2 | 2/2009 | Menon |
| 7,609,623 | B2 | 10/2009 | Taylor et al. |
| 7,630,302 | B2 | 12/2009 | Taylor et al. |
| 7,639,606 | B2 | 12/2009 | Taylor et al. |
| 7,639,623 | B2 | 12/2009 | Taylor et al. |
| 7,646,707 | B2 | 1/2010 | Taylor et al. |
| 7,680,928 | B2 | 3/2010 | Lean et al. |
| 7,768,904 | B2 | 8/2010 | Taylor et al. |
| 8,031,588 | B2 | 10/2011 | Taylor et al. |
| 8,031,620 | B2 | 10/2011 | Taylor et al. |
| 8,199,638 | B2 | 6/2012 | Taylor et al. |
| 8,200,802 | B2 | 6/2012 | Taylor et al. |
| 8,203,933 | B2 | 6/2012 | Taylor et al. |
| 8,223,632 | B2 | 7/2012 | Taylor et al. |
| 8,243,592 | B2 | 8/2012 | Taylor et al. |
| 8,339,938 | B2 | 12/2012 | Taylor et al. |
| 8,339,988 | B2 | 12/2012 | Taylor et al. |
| 8,345,537 | B2 | 1/2013 | Taylor et al. |
| 8,345,543 | B2 | 1/2013 | Taylor et al. |
| 8,509,058 | B2 | 8/2013 | Taylor et al. |
| 8,509,118 | B2 | 8/2013 | Taylor et al. |
| 2001/0000700 | A1 | 5/2001 | Eslambolchi et al. |
| 2001/0010681 | A1 | 8/2001 | McAllister et al. |
| 2002/0001307 | A1 | 1/2002 | Nguyen et al. |
| 2002/0067698 | A1 | 6/2002 | Gourley et al. |
| 2002/0072358 | A1 | 6/2002 | Schneider et al. |
| 2002/0089985 | A1 | 7/2002 | Wahl et al. |
| 2002/0112072 | A1 | 8/2002 | Jain |
| 2002/0131362 | A1 | 9/2002 | Callon |
| 2002/0172148 | A1 | 11/2002 | Kim et al. |
| 2002/0181402 | A1 | 12/2002 | Lemoff et al. |
| 2003/0043753 | A1 | 3/2003 | Nelson et al. |
| 2003/0051049 | A1 | 3/2003 | Noy et al. |
| 2003/0051195 | A1 | 3/2003 | Bosa et al. |
| 2003/0086413 | A1 | 5/2003 | Tartarelli et al. |
| 2003/0091024 | A1 | 5/2003 | Stumer |
| 2003/0092390 | A1 | 5/2003 | Haumont |
| 2003/0117951 | A1 | 6/2003 | Wiebe et al. |
| 2003/0128692 | A1 | 7/2003 | Mitsumori et al. |
| 2003/0152028 | A1 | 8/2003 | Raisanen et al. |

| | | | |
|---|---|---|---|
| 2003/0185151 A1 | 10/2003 | Kurosawa et al. |
| 2004/0090918 A1 | 5/2004 | McLendon |
| 2004/0090973 A1 | 5/2004 | Christie et al. |
| 2004/0125776 A1 | 7/2004 | Haugli et al. |
| 2004/0141464 A1 | 7/2004 | Taylor et al. |
| 2004/0172574 A1 | 9/2004 | Wing et al. |
| 2004/0202112 A1 | 10/2004 | McAllister et al. |
| 2005/0002339 A1 | 1/2005 | Patil et al. |
| 2005/0013242 A1 | 1/2005 | Chen et al. |
| 2005/0135237 A1 | 6/2005 | Taylor et al. |
| 2005/0135238 A1 | 6/2005 | Taylor et al. |
| 2005/0135254 A1 | 6/2005 | Taylor et al. |
| 2005/0135263 A1 | 6/2005 | Taylor et al. |
| 2005/0138203 A1 | 6/2005 | Taylor et al. |
| 2005/0138476 A1 | 6/2005 | Taylor et al. |
| 2005/0152028 A1 | 7/2005 | Mitzkus |
| 2005/0172160 A1 | 8/2005 | Taylor et al. |
| 2005/0172174 A1 | 8/2005 | Taylor et al. |
| 2005/0237925 A1 | 10/2005 | Taylor et al. |
| 2005/0238006 A1 | 10/2005 | Taylor et al. |
| 2005/0238007 A1 | 10/2005 | Taylor et al. |
| 2005/0238024 A1 | 10/2005 | Taylor et al. |
| 2005/0240840 A1 | 10/2005 | Taylor et al. |
| 2005/0276216 A1 | 12/2005 | Vasseur et al. |
| 2006/0013210 A1 | 1/2006 | Bordogna et al. |
| 2006/0146700 A1 | 7/2006 | Taylor et al. |
| 2006/0153066 A1 | 7/2006 | Saleh et al. |
| 2007/0050492 A1 | 3/2007 | Jorgensen |
| 2007/0168200 A1 | 7/2007 | Shimizu |
| 2009/0041012 A1 | 2/2009 | Taylor et al. |
| 2009/0086626 A1 | 4/2009 | Taylor et al. |
| 2009/0103544 A1 | 4/2009 | Taylor et al. |
| 2009/0323534 A1 | 12/2009 | Taylor et al. |
| 2010/0020677 A1 | 1/2010 | Taylor et al. |
| 2010/0046366 A1 | 2/2010 | Taylor et al. |
| 2010/0046380 A1 | 2/2010 | Taylor et al. |
| 2010/0054122 A1 | 3/2010 | Taylor et al. |
| 2012/0224475 A1 | 9/2012 | Taylor et al. |
| 2012/0266015 A1 | 10/2012 | Taylor et al. |
| 2012/0275299 A1 | 11/2012 | Taylor et al. |

OTHER PUBLICATIONS

United States Patent and Trademark Office, "Final Office Action," issued in connection with U.S. Appl. No. 12/551,477, on Jul. 11, 2011 (13 pages).

United States Patent and Trademark Office, "Notice of Allowance," issued in connection with U.S. Appl. No. 12/551,477, on Mar. 1, 2012 (8 pages).

United States Patent and Trademark Office, "Notice of Panel Decision from Pre-Appeal Brief Review," issued in connection with U.S. Appl. No. 12/551,477, on Jan. 13, 2012 (2 pages).

United States Patent and Trademark Office, "Non-Final Office Action," issued in connection with U.S. Appl. No. 12/570,938, on Oct. 7, 2010 (19 pages).

United States Patent and Trademark Office, "Notice of Allowance," issued in connection with U.S. Appl. No. 12/570,938, on Jun. 20, 2011 (14 pages).

United States Patent and Trademark Office, "Non-Final Office Action," issued in connection with U.S. Appl. No. 12/609,415, on Dec. 9, 2010 (12 pages).

United States Patent and Trademark Office, "Non-Final Office Action," issued in connection with U.S. Appl. No. 12/609,415, on Jun. 23, 2011 (12 pages).

United States Patent and Trademark Office, "Final Office Action," issued in connection with U.S. Appl. No. 12/609,415, on Mar. 7, 2012 (12 pages).

United States Patent and Trademark Office, "Notice of Allowance," issued in connection with U.S. Appl. No. 12/609,415, on Aug. 22, 2012 (17 pages).

United States Patent and Trademark Office, "Non-Final Office Action," issued in connection with U.S. Appl. No. 12/609,640, on Dec. 9, 2010 (11 pages).

United States Patent and Trademark Office, "Non-Final Office Action," issued in connection with U.S. Appl. No. 12/609,683, on Oct. 25, 2010 (15 pages).

United States Patent and Trademark Office, "Notice of Allowance," issued in connection with U.S. Appl. No. 12/609,683, on Jul. 12, 2011 (24 pages).

United States Patent and Trademark Office, "Non-Final Office Action," issued in connection with U.S. Appl. No. 12/967,930, on Apr. 29, 2011 (6 pages).

United States Patent and Trademark Office, "Notice of Allowance," issued in connection with U.S. Appl. No. 12/967,930, on Jan. 30, 2012 (13 pages).

United States Patent and Trademark Office, "Non-Final Office Action," issued in connection with U.S. Appl. No. 13/547,474, on Nov. 2, 2012 (8 pages).

Don Ryan, The Telco Handbook for New Technicians—An Introduction to Telco Technology and Troubleshooting, Oct. 27, 2000, [retrieved from http://www.darkwing.net/aaron/telco.doc, accessed on Nov. 11, 2006], 67 pages.

Chen, Thomas M. and Liu, Steve S., Management and Control Functions in ATM Switching Systems, IEEE Network, Jul./Aug. 1994 (7 pages).

Meserole, Thomas A. and Prasad, Anil Customer Network Management (CNM) for ATM Public Network Service (M3 Specification), af-nm-0019.000, Rev. 1.04, Oct. 1994 (13 pages).

Mangan, Tim, OA&M: How a Frame Relay SLA is Measured and Diagnosed, http://www.mfaforum.org/frame/Whitepaper/whitepapers/OAMwhitepaper.shtml, Apr. 2001, (11 pages).

United States Patent and Trademark Office, "Non-Final Office Action," issued in connection with U.S. Appl. No. 13/472,244, on Jan. 22, 2013 (18 pages).

United States Patent and Trademark Office, "Non-Final Office Action," issued in connection with U.S. Appl. No. 13/475,577, on Mar. 15, 2013 (10 pages).

United States Patent and Trademark Office, "Notice of Allowance," issued in connection with U.S. Appl. No. 13/690,884, on Mar. 29, 2013 (10 pages).

United States Patent and Trademark Office, "Notice of Allowance," issued in connection with U.S. Appl. No. 13/690,861, on Apr. 12, 2013 (10 pages).

United States Patent and Trademark Office, "Notice of Allowance," issued in connection with U.S. Appl. No. 13/690,839, on Apr. 30, 2013 (11 pages).

United States Patent and Trademark Office, "Non-Final Office Action," issued in connection with U.S. Appl. No. 10/348,077, on Jan. 4, 2007 (15 pages).

United States Patent and Trademark Office, "Interview Summary," issued in connection with U.S. Appl. No. 10/348,077, on May 11, 2007 (2 pages).

United States Patent and Trademark Office, "Final Office Action," issued in connection with U.S. Appl. No. 10/348,077, on Aug. 10, 2007 (26 pages).

United States Patent and Trademark Office, "Notice of Allowance," issued in connection with U.S. Appl. No. 10/348,077, on Apr. 29, 2008 (10 pages).

United States Patent and Trademark Office, "Notice of Allowance," issued in connection with U.S. Appl. No. 10/348,592, on Oct. 14, 2008 (4 pages).

United States Patent and Trademark Office, "Final Office Action," issued in connection with U.S. Appl. No. 10/348,592, on Mar. 21, 2008 (11 pages).

United States Patent and Trademark Office, "Non-Final Office Action," issued in connection with U.S. Appl. No. 10/348,592, on Jun. 14, 2007 (10 pages).

United States Patent and Trademark Office, "Non-Final Office Action," issued in connection with U.S. Appl. No. 10/348,592, on Sep. 8, 2006 (7 pages).

United States Patent and Trademark Office, "Notice of Allowance," issued in connection with U.S. Appl. No. 10/744,281, on Oct. 30, 2007 (8 pages).

United States Patent and Trademark Office, "Notice of Allowance," issued in connection with U.S. Appl. No. 10/744,281, on Aug. 27, 2007 (6 pages).

United States Patent and Trademark Office, "Interview Summary," issued in connection with U.S. Appl. No. 10/744,281, on Aug. 6, 2007 (3 pages).

United States Patent and Trademark Office, "Final Office Action," issued in connection with U.S. Appl. No. 10/744,281, on Apr. 17, 2007 (18 pages).

United States Patent and Trademark Office, "Interview Summary," issued in connection with U.S. Appl. No. 10/744,281, on Nov. 27, 2006 (3 pages).

United States Patent and Trademark Office, "Non-Final Office Action," issued in connection with U.S. Appl. No. 10/744,281, on Oct. 2, 2006 (16 pages).

United States Patent and Trademark Office, "Notice of Allowance," issued in connection with U.S. Appl. No. 10/744,283, on Sep. 18, 2009 (11 pages).

United States Patent and Trademark Office, "Non-Final Office Action," issued in connection with U.S. Appl. No. 10/744,283, on Apr. 14, 2009 (13 pages).

United States Patent and Trademark Office, "Non-Final Office Action," issued in connection with U.S. Appl. No. 10/744,283, on Oct. 30, 2008 (13 pages).

United States Patent and Trademark Office, "Final Office Action," issued in connection with U.S. Appl. No. 10/744,283, on Apr. 17, 2008 (11 pages).

United States Patent and Trademark Office, "Non-Final Office Action," issued in connection with U.S. Appl. No. 10/744,283, on Jul. 20, 2007 (12 pages).

United States Patent and Trademark Office, "Notice of Allowance," issued in connection with U.S. Appl. No. 10/744,555, on Jun. 7, 2012. (13 pages).

United States Patent and Trademark Office, "Notice of Allowance," issued in connection with U.S. Appl. No. 10/744,555, on Feb. 6, 2012. (8 pages).

United States Patent and Trademark Office, "Non-Final Office Action," issued in connection with U.S. Appl. No. 10/744,555, on Apr. 14, 2011 (19 pages).

United States Patent and Trademark Office, "Final Office Action," issued in connection with U.S. Appl. No. 10/744,555, on Oct. 7, 2010 (26 pages).

United States Patent and Trademark Office, "Non-Final Office Action," issued in connection with U.S. Appl. No. 10/744,555, on Feb. 1, 2010 (26 pages).

United States Patent and Trademark Office, "Final Office Action," issued in connection with U.S. Appl. No. 10/744,555, on Jul. 17, 2009 (27 pages).

United States Patent and Trademark Office, "Non-Final Office Action," issued in connection with U.S. Appl. No. 10/744,555, on Jan. 14, 2009 (37 pages).

United States Patent and Trademark Office, "Final Office Action," issued in connection with U.S. Appl. No. 10/744,555, on May 12, 2008 (34 pages).

United States Patent and Trademark Office, "Non-Final Office Action," issued in connection with U.S. Appl. No. 10/744,555, on Aug. 6, 2007 (18 pages).

United States Patent and Trademark Office, "Final Office Action," issued in connection with U.S. Appl. No. 10/744,921, on Apr. 6, 2009 (23 pages).

United States Patent and Trademark Office, "Non-Final Office Action," issued in connection with U.S. Appl. No. 10/744,921, on Oct. 31, 2008 (23 pages).

United States Patent and Trademark Office, "Final Office Action," issued in connection with U.S. Appl. No. 10/744,921, on May 1, 2008 (24 pages).

United States Patent and Trademark Office, "Non-Final Office Action," issued in connection with U.S. Appl. No. 10/744,921, on Aug. 8, 2007 (16 pages).

United States Patent and Trademark Office, "Non-Final Office Action," issued in connection with U.S. Appl. No. 10/744,921, on Jul. 9, 2009 (24 pages).

United States Patent and Trademark Office, "Final Office Action," issued in connection with U.S. Appl. No. 10/744,921, on Mar. 3, 2010 (23 pages).

United States Patent and Trademark Office, "Notice of Panel Decision from Pre-Appeal Brief Review," issued in connection with U.S. Appl. No. 10/744,921, on Sep. 7, 2010 (2 pages).

United States Patent and Trademark Office, "Non-Final Office Action," issued in connection with U.S. Appl. No. 10/744,921, on May 11, 2011 (20 pages).

United States Patent and Trademark Office, "Notice of Allowance," issued in connection with U.S. Appl. No. 10/744,921, on Apr. 23, 2012 (19 pages).

United States Patent and Trademark Office, "Final Office Action," issued in connection with U.S. Appl. No. 10/745,047, on Mar. 27, 2009 (18 pages).

United States Patent and Trademark Office, "Non-Final Office Action," issued in connection with U.S. Appl. No. 10/745,047, on Jun. 12, 2008 (18 pages).

United States Patent and Trademark Office, "Notice of Allowance," issued in connection with U.S. Appl. No. 10/745,047, on Jul. 23, 2009 (7 pages).

United States Patent and Trademark Office, "Notice of Allowance," issued in connection with U.S. Appl. No. 10/745,116, on Aug. 14, 2009 (7 pages).

United States Patent and Trademark Office, "Notice of Allowance," issued in connection with U.S. Appl. No. 10/745,116, on May 7, 2009 (17 pages).

United States Patent and Trademark Office, "Final Office Action," issued in connection with U.S. Appl. No. 10/745,116, on Apr. 28, 2008 (25 pages).

United States Patent and Trademark Office, "Notice of Allowance," issued in connection with U.S. Appl. No. 10/745,116, on Dec. 3, 2008 (8 pages).

United States Patent and Trademark Office, "Non-Final Office Action," issued in connection with U.S. Appl. No. 10/745,116, on Aug. 7, 2007 (20 pages).

United States Patent and Trademark Office, "Notice of Allowance," issued in connection with U.S. Appl. No. 10/745,117, on May 14, 2009 (30 pages).

United States Patent and Trademark Office, "Non-Final Office Action," issued in connection with U.S. Appl. No. 10/745,117, on Nov. 26, 2008 (21 pages).

United States Patent and Trademark Office, "Final Office Action," issued in connection with U.S. Appl. No. 10/745,117, on May 12, 2008 (15 pages).

United States Patent and Trademark Office, "Non-Final Office Action," issued in connection with U.S. Appl. No. 10/745,117, on Apr. 17, 2008 (15 pages).

United States Patent and Trademark Office, "Non-Final Office Action," issued in connection with U.S. Appl. No. 10/745,117, on Aug. 8, 2007 (14 pages).

United States Patent and Trademark Office, "Supplemental Notice of Allowance," issued in connection with U.S. Appl. No. 10/745,117, on Jun. 15, 2009 (4 pages).

United States Patent and Trademark Office, "Notice of Allowance," issued in connection with U.S. Appl. No. 10/745,117, on Aug. 27, 2009 (7 pages).

United States Patent and Trademark Office, "Non-Final Office Action," issued in connection with U.S. Appl. No. 10/745,168, on Dec. 2, 2008 (25 pages).

United States Patent and Trademark Office, "Final Office Action," issued in connection with U.S. Appl. No. 10/745,168, on May 2, 2008 (21 pages).

United States Patent and Trademark Office, "Final Office Action," issued in connection with U.S. Appl. No. 10/745,168, on Aug. 8, 2007 (17 pages).

United States Patent and Trademark Office, "Notice of Allowance," issued in connection with U.S. Appl. No. 10/745,168, on Jun. 12, 2009 (22 pages).

United States Patent and Trademark Office, "Notice of Allowance," issued in connection with U.S. Appl. No. 10/745,168, on Aug. 7, 2009 (7 pages).

United States Patent and Trademark Office, "Notice of Allowance," issued in connection with U.S. Appl. No. 10/745,170, on Mar. 30, 2012, (7 pages).

United States Patent and Trademark Office, "Notice of Allowance," issued in connection with U.S. Appl. No. 10/745,170, on Dec. 27, 2011 (10 pages).

United States Patent and Trademark Office, "Notice of Panel Decision from Pre-Appeal Brief Review," issued in connection with U.S. Appl. No. 10/745,170, on Apr. 26, 2011 (2 pages).

United States Patent and Trademark Office, "Final Office Action," issued in connection with U.S. Appl. No. 10/745,170, on Oct. 26, 2010 (24 pages).

United States Patent and Trademark Office, "Non-Final Office Action," issued in connection with U.S. Appl. No. 10/745,170, on Mar. 30, 2010 (24 pages).

United States Patent and Trademark Office, "Non-Final Office Action," issued in connection with U.S. Appl. No. 10/745,170, on Oct. 14, 2009 (23 pages).

United States Patent and Trademark Office, "Final Office Action," issued in connection with U.S. Appl. No. 10/745,170, on Apr. 28, 2009 (21 pages).

United States Patent and Trademark Office, "Non-Final Office Action," issued in connection with U.S. Appl. No. 10/745,170, on Nov. 14, 2008 (21 pages).

United States Patent and Trademark Office, "Advisory Action," issued in connection with U.S. Appl. No. 10/745,170, on Oct. 21, 2008 (3 pages).

United States Patent and Trademark Office, "Final Office Action," issued in connection with U.S. Appl. No. 10/745,170, on Apr. 17, 2008 (14 pages).

United States Patent and Trademark Office, "Non-Final Office Action," issued in connection with U.S. Appl. No. 10/745,170, on Jul. 20, 2007 (14 pages).

United States Patent and Trademark Office, "Final Office Action," issued in connection with U.S. Appl. No. 10/829,495, on Mar. 23, 2009 (26 pages).

United States Patent and Trademark Office, "Non-Final Office Action," issued in connection with U.S. Appl. No. 10/829,495, on Oct. 29, 2008 (25 pages).

United States Patent and Trademark Office, "Final Office Action," issued in connection with U.S. Appl. No. 10/829,495, on Jun. 11, 2008 (22 pages).

United States Patent and Trademark Office, "Non-Final Office Action," issued in connection with U.S. Appl. No. 10/829,495, on Sep. 7, 2007 (24 pages).

United States Patent and Trademark Office, "Advisory Action," issued in connection with U.S. Appl. No. 10/829,495, on Jun. 4, 2009 (3 pages).

United States Patent and Trademark Office, "Non-Final Office Action," issued in connection with U.S. Appl. No. 10/829,495, on Oct. 1, 2009 (28 pages).

United States Patent and Trademark Office, "Notice of Allowance," issued in connection with U.S. Appl. No. 10/829,495, on Apr. 29, 2010 (7 pages).

United States Patent and Trademark Office, "Interview Summary," issued in connection with U.S. Appl. No. 10/829,509, on Sep. 20, 2006 (4 pages).

United States Patent and Trademark Office, "Notice of Allowance," issued in connection with U.S. Appl. No. 10/829,509, on Jul. 10, 2007 (7 pages).

United States Patent and Trademark Office, "Notice of Allowance," issued in connection with U.S. Appl. No. 10/829,509, on Feb. 1, 2007 (8 pages).

United States Patent and Trademark Office, "Final Office Action," issued in connection with U.S. Appl. No. 10/829,509, on Nov. 13, 2006 (12 pages).

United States Patent and Trademark Office, "Non-Final Office Action," issued in connection with U.S. Appl. No. 10/829,509, on May 15, 2006 (11 pages).

United States Patent and Trademark Office, "Final Office Action," issued in connection with U.S. Appl. No. 10/829,539, on Mar. 13, 2009 (29 pages).

United States Patent and Trademark Office, "Non-Final Office Action," issued in connection with U.S. Appl. No. 10/829,539, on Nov. 25, 2008 (23 pages).

United States Patent and Trademark Office, "Final Office Action," issued in connection with U.S. Appl. No. 10/829,539, on Aug. 20, 2008 (29 pages).

United States Patent and Trademark Office, "Interview Summary," issued in connection with U.S. Appl. No. 10/829,539, on Apr. 28, 2008 (2 pages).

United States Patent and Trademark Office, "Non-Final Office Action," issued in connection with U.S. Appl. No. 10/829,539, on Oct. 17, 2007 (19 pages).

United States Patent and Trademark Office, "Advisory Action," issued in connection with U.S. Appl. No. 10/829,539, on Jun. 12, 2009 (3 pages).

United States Patent and Trademark Office, "Non-Final Office Action," issued in connection with U.S. Appl. No. 10/829,539, on Aug. 25, 2009 (41 pages).

United States Patent and Trademark Office, "Non-Final Office Action," issued in connection with U.S. Appl. No. 10/829,539, on Apr. 27, 2010 (32 pages).

United States Patent and Trademark Office, "Final Office Action," issued in connection with U.S. Appl. No. 10/829,539, on Sep. 23, 2010 (32 pages).

United States Patent and Trademark Office, "Non-Final Office Action," issued in connection with U.S. Appl. No. 10/829,539, on Mar. 22, 2011 (35 pages).

United States Patent and Trademark Office, "Final Office Action," issued in connection with U.S. Appl. No. 10/829,539, on Sep. 29, 2011 (37 pages).

United States Patent and Trademark Office, "Non-Final Office Action," issued in connection with U.S. Appl. No. 10/829,539, on Jan. 30, 2012 (37 pages).

United States Patent and Trademark Office, "Notice of Allowance," issued in connection with U.S. Appl. No. 10/829,539, on Aug. 16, 2012 (13 pages).

United States Patent and Trademark Office, "Office Communication—No Action Count," issued in connection with U.S. Appl. No. 10/829,584, on Oct. 16, 2008 (4 pages).

United States Patent and Trademark Office, "Notice of Allowance," issued in connection with U.S. Appl. No. 10/829,584, on Sep. 22, 2008 (7 pages).

United States Patent and Trademark Office, "Final Office Action," issued in connection with U.S. Appl. No. 10/829,584, on Jun. 25, 2008 (20 pages).

United States Patent and Trademark Office, "Non-Final Office Action," issued in connection with U.S. Appl. No. 10/829,584, on Sep. 19, 2007 (15 pages).

United States Patent and Trademark Office, "Supplemental Notice of Allowance," issued in connection with U.S. Appl. No. 10/829,795, on Nov. 13, 2008 (2 pages).

United States Patent and Trademark Office, "Notice of Allowance," issued in connection with U.S. Appl. No. 10/829,795, on Sep. 9, 2008 (7 pages).

United States Patent and Trademark Office, "Final Office Action," issued in connection with U.S. Appl. No. 10/829,795, on Apr. 30, 2008 (20 pages).

United States Patent and Trademark Office, "Non-Final Office Action," issued in connection with U.S. Appl. No. 10/829,795, on Sep. 10, 2007 (21 pages).

United States Patent and Trademark Office, "Interview Summary," issued in connection with U.S. Appl. No. 10/829,795, on Aug. 1, 2008 (2 pages).

United States Patent and Trademark Office, "Non-Final Office Action," issued in connection with U.S. Appl. No. 12/254,233, on Apr. 15, 2010 (24 pages).

United States Patent and Trademark Office, "Final Office Action," issued in connection with U.S. Appl. No. 12/254,233, on Sep. 29, 2010 (26 pages).

United States Patent and Trademark Office, "Non-Final Office Action," issued in connection with U.S. Appl. No. 12/254,233, on Mar. 25, 2011 (28 pages).

United States Patent and Trademark Office, "Final Office Action," issued in connection with U.S. Appl. No. 12/254,233, on Oct. 3, 2011 (29 pages).

United States Patent and Trademark Office, "Non-Final Office Action," issued in connection with U.S. Appl. No. 12/254,233, on Jan. 30, 2012 (29 pages).

United States Patent and Trademark Office, "Notice of Allowance," issued in connection with U.S. Appl. No. 12/254,233, on Aug. 16, 2012 (19 pages).

United States Patent and Trademark Office, "Non-Final Office Action," issued in connection with U.S. Appl. No. 12/334,248, on Apr. 13, 2010 (23 pages).

United States Patent and Trademark Office, "Final Office Action," issued in connection with U.S. Appl. No. 12/334,248, on Sep. 29, 2010 (25 pages).

United States Patent and Trademark Office, "Non-Final Office Action," issued in connection with U.S. Appl. No. 12/334,248, on Mar. 25, 2011 (28 pages).

United States Patent and Trademark Office, "Final Office Action," issued in connection with U.S. Appl. No. 12/334,248, on Oct. 3, 2011 (29 pages).

United States Patent and Trademark Office, "Non-Final Office Action," issued in connection with U.S. Appl. No. 12/334,248, on Jan. 30, 2012 (29 pages).

United States Patent and Trademark Office, "Notice of Allowance," issued in connection with U.S. Appl. No. 12/334,248, on Aug. 22, 2012 (16 pages).

United States Patent and Trademark Office, "Non-Final Office Action," issued in connection with U.S. Appl. No. 12/339,426, on Mar. 8, 2010 (6 pages).

United States Patent and Trademark Office, "Notice of Allowance," issued in connection with U.S. Appl. No. 12/339,426, on Nov. 8, 2010 (9 pages).

United States Patent and Trademark Office, "Notice of Allowance," issued in connection with U.S. Appl. No. 13/547,474, on May 29, 2013 (10 pages).

United States Patent and Trademark Office, "Final Office Action," issued in connection with U.S. Appl. No. 13/472,244, on Aug. 13, 2013 (11 pages).

* cited by examiner

METHODS AND SYSTEMS FOR AUTOMATICALLY REROUTING LOGICAL CIRCUIT DATA

PRIORITY APPLICATIONS

This is a continuation of U.S. patent application Ser. No. 12/609,415, filed on Oct. 30, 2009, which is a continuation of U.S. patent application Ser. No. 10/745,168, now U.S. Pat. No. 7,639,606, filed on Dec. 23, 2003, all of which are hereby incorporated herein by reference in their entireties.

CROSS-REFERENCE TO RELATED APPLICATIONS

This patent is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This patent is also related to and filed concurrently with U.S. patent application Ser. No. 10/745,117, entitled "Method And System For Providing A Failover Circuit For Rerouting Logical Circuit Data In A Data Network," filed on Dec. 23, 2003, U.S. patent application Ser. No. 10/744,281, entitled "Method And System For Utilizing A Logical Failover Circuit For Rerouting Data Between Data Networks," filed on Dec. 23, 2003, U.S. patent application Ser. No. 10/745,047, entitled "Method And System For Automatically Renaming Logical Circuit Identifiers For Rerouted Logical Circuits In A Data Network," filed on Dec. 23, 2003, U.S. patent application Ser. No. 10/745,170, entitled "Method And System For Automatically Identifying A Logical Circuit Failure In A Data Network," filed on Dec. 23, 2003, U.S. patent application Ser. No. 10/744,921, entitled "Method And System For Automatically Rerouting Logical Circuit Data In A Data Network," filed on Dec. 23, 2003, U.S. patent application Ser. No. 10/745,116, entitled "Method And System For Automatically Rerouting Data From An Overbalanced Logical Circuit In A Data Network," filed on Dec. 23, 2003, U.S. patent application Ser. No. 10/744,283, entitled "Method And System For Real Time Simultaneous Monitoring Of Logical Circuits In A Data Network," filed on Dec. 23, 2003, U.S. patent application Ser. No. 10/744,555, entitled "Method And System For Prioritized Rerouting Of Logical Circuit Data In A Data Network," filed on Dec. 23, 2003. All of the above-referenced applications are assigned to the same assignee as this patent and are expressly incorporated herein by reference.

TECHNICAL FIELD

The present invention relates to the routing of data using logical circuits in a virtual private network. More particularly, the present invention is related to automatically rerouting data from failed logical circuits in a virtual private network.

BACKGROUND

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host device is delivered to the network through a physical circuit such as a T1 line that links to a switch of the network. The remote device that communicates with the host through the network also has a physical circuit to a switch of the network. A network circuit also includes a logical circuit which includes a variable communication path for data between the switches associated with the host and the remote device.

In large-scale networks, the host and remote end devices of a network circuit may be connected across different local access and transport areas ("LATAs") which may in turn be connected to one or more Inter-Exchange Carriers ("IEC") for transporting data between the LATAs. These connections are made through physical trunk circuits utilizing fixed logical connections known as Network-to-Network Interfaces ("NNIs").

Many business organizations setup private networks which utilize large-scale public data networks (such as frame relay or ATM) for communicating data between multiple sites. These private networks are known as virtual private networks ("VPNs"). Typically, VPNs include dedicated physical connections to a public data network as well as dedicated physical trunk circuits for communicating data securely through the network to multiple sites. The dedicated physical trunk circuits only carry VPN traffic and thus also include dedicated logical connections or NNIs for communicating logical circuit data within the public data network. Periodically, failures may occur to the dedicated trunk circuits or the dedicated NNIs of VPN network circuits, causing lost data. Currently, VPN network circuit failures are handled by dispatching technicians on each end of the VPN network circuit (i.e., in each LATA) in response to a reported failure. The technicians manually access a logical element module to troubleshoot the logical circuit portion of the VPN network circuit. A logical element module communicates with the switches in the data network and provides the technician with the status of the logical connections which make up the logical circuit. Once the technician determines the status of a logical connection at one end of a logical circuit (e.g., the host end), the technician then must access a network database to determine the location of the other end of the logical circuit so that its status may also be ascertained. If the technician determines the logical circuit is operating properly, the technician then accesses a physical element module to troubleshoot the physical circuit portion of the VPN network circuit to determine the cause of the failure and then repair it.

Current methods of determining VPN network circuit failures, however, suffer from several drawbacks. One drawback is that troubleshooting logical and physical circuits is time consuming and results in dropped data packets or cells until the failure is isolated and repaired. Furthermore troubleshooting the physical circuit often requires taking the VPN network circuit out of service to perform testing, thus increasing the downtime and loss of data in the logical circuit. Moreover, if the failure cannot be isolated by the technicians in a LATA or the failure is located at the interface to the IEC, cooperative testing with the IEC must also be coordinated to isolate the failure leading to a further increase in downtime and loss of data in the VPN network circuit.

It is with respect to these considerations and others that the present invention has been made.

SUMMARY

In accordance with the present invention, the above and other problems are solved by methods for automatically rerouting data from failed logical circuits in a virtual private network ("VPN"). A dedicated logical circuit in the VPN is monitored for status information indicating a failure. When a failure in the dedicated logical circuit is detected, the data in the circuit may be rerouted to a "logical failover network," thereby minimizing lost data until the trouble in the logical circuit is resolved.

According to one method, a dedicated logical circuit in the VPN is monitored for status information pertinent to the dedicated logical circuit. The dedicated logical circuit includes a primary communication path for communicating data. Based on the status information, a failure is identified in the dedicated logical circuit. Once the failure in the dedicated logical circuit is determined, a logical failover circuit is then identified. The logical failover circuit includes an alternate communication path for communicating the data for the failed dedicated logical circuit. After the logical failover circuit has been identified, the data from the dedicated failed logical circuit is rerouted to the logical failover circuit without manual intervention. After the data has been rerouted the logical failover circuit, the method may further include making a determination as to whether the failure in the dedicated logical circuit has been corrected. If it is determined that the failure in the dedicated logical circuit has been corrected, then the data from the logical failover circuit is rerouted back to the dedicated logical circuit in the VPN without manual intervention.

In monitoring the dedicated logical circuit, the method may include requesting trap data from one or more dedicated logical connections which make up the dedicated logical circuit. The trap data may include status information for each dedicated logical connection in the VPN. In identifying a failure of the dedicated logical circuit, the method may further include analyzing the trap data for each dedicated logical connection and if the status information for a dedicated logical connection indicates that comprising an alternate communication path for communicating the data, and reroutes the data from the dedicated logical circuit to the logical failover circuit without manual intervention. After rerouting the data to the logical failover circuit, the network management module is further operative to communicate with the logical element module to determine whether the failure in the dedicated logical circuit has been corrected and if the failure in the dedicated logical circuit has been corrected, then reroute the data from the logical failover circuit to the dedicated logical circuit without manual intervention.

The dedicated logical circuit may include one or more dedicated logical connections. The network management module may determine a failure in a dedicated logical connection to determine a failure of the dedicated logical circuit. The dedicated logical circuit may be identified by a first logical circuit identifier in the data network while the logical failover circuit may be identified by a second logical identifier in the data network. The network management module may be further operative to rename the first logical circuit identifier of the failed dedicated logical circuit to the second logical circuit identifier of the logical fail over circuit prior to rerouting the data.

These and various other features as well as advantages, which characterize the present invention, will be apparent from a reading of the following detailed description and a review of the associated drawings.

DETAILED DESCRIPTION

Figure 1:
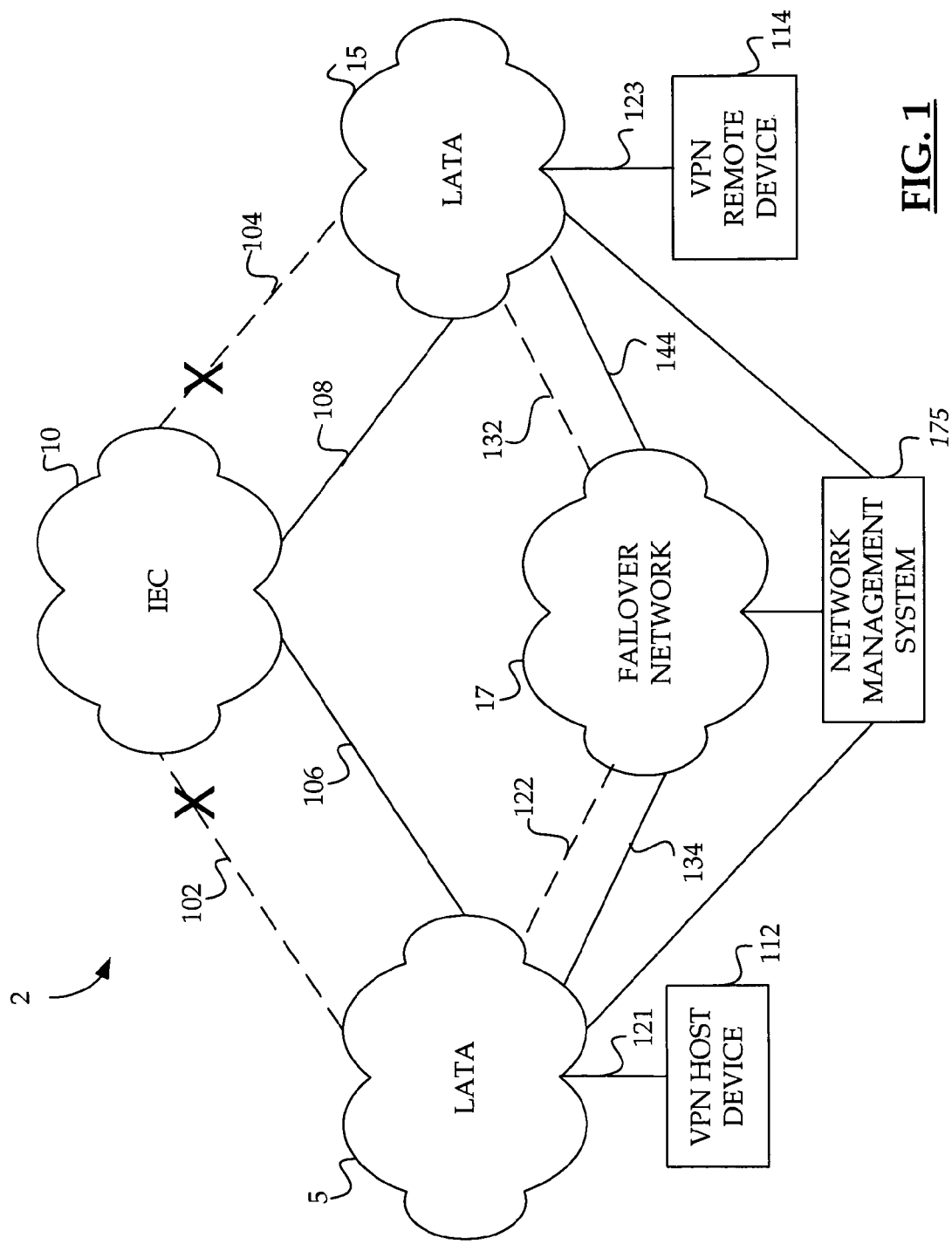
FIG. 1 illustrates a virtual private data network according to an embodiment of the invention.

Embodiments of the present invention provide for a method and system for automatically rerouting data from failed logical circuits in a virtual private network ("VPN"). A dedicated logical circuit in the VPN is monitored for status information indicating a failure. When a failure in the dedicated logical circuit is detected, the data in the circuit may be rerouted to a "logical failover network," thereby minimizing lost data until the trouble in the logical circuit is resolved. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Embodiments of the present invention may be generally employed in a virtual private data network ("VPN") 2 as shown in FIG. 1. The VPN 2 includes local access and transport areas ("LATAs") 5 and 15 which are connected by an Inter-Exchange Carrier ("IEC") 10. It should be understood that the LATAs 5 and 15 may be public data networks operated by a commonly owned Local Exchange Carrier ("LEC"). It should be further understood that the IEC 10 may include one or more public data networks which may be operated by a commonly owned IEC. It will be appreciated by those skilled in the art that the VPN 2 may include a frame relay network, asynchronous transfer mode ("ATM") network, or any other network capable of communicating data conforming to Layers 2-4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The VPN 2 includes a dedicated network circuit which channels data between a VPN host device 112 and a VPN remote device 114 through the LATA 5, the IEC 10, and the LATA 15. It should be understood that the dedicated network circuit in the VPN 2 only communicates customer data originating and/or terminating at the VPN host device 112 and the VPN remote device 114. That is, no other customer data is carried over the network circuit. That is, no other customer data is carried over the network circuit. It should be further understood that the host and remote devices 112 and 114 may be local area network ("LAN") routers or remote access switches ("RAS") having network interfaces (e.g., frame relay or ATM interfaces) for enabling secured access to the VPN. It will be appreciated that these devices may alternatively be known as "VPN Gateways" to those skilled in the art. It will be further appreciated that in the data network 2, the LATAs 5 and 15 and the IEC 10 may include network elements (not shown) which support interworking to enable communications between host and remote devices supporting dissimilar protocols. Network elements in a data network supporting interworking may translate frame relay data packets or frames to ATM data packets or cells so that a host device may communicate with a remote device having an ATM interface. The LATAs 5 and 15 and the IEC 10 may further include one or more interconnected network elements, such as switches (not shown), for transmitting data. An illustrative LATA data network will be discussed in greater detail in the description of FIG. 2 below.

The dedicated network circuit between the VPN host device 112 and the VPN remote device 114 in the VPN 2 includes a dedicated physical circuit and a dedicated logical circuit. As used in the foregoing description and the appended claims, a dedicated physical circuit is defined as the physical path that connects the end point of a dedicated network circuit to a network device. For example, the dedicated physical circuit of the dedicated network circuit between the VPN host device 112 and the VPN remote device 114 includes the dedicated physical connection 121 between the VPN host device 112 and the LATA 5, the dedicated physical connection 106 between the LATA 5 and the IEC 10, the dedicated physical connection 108 between the IEC 10 and the LATA 15, and the dedicated physical connection 123 between the LATA 15 and the VPN remote device 114. Routers and switches within the LATAs 5 and 15 and the IEC 10 carry the physical signal between the VPN host and remote end devices 112 and 114 through the dedicated physical circuit.

It should be understood that the VPN host and remote devices 112 and 114 may be connected to the dedicated physical circuit described above using user-to-network interfaces ("UNIs"). As is known to those skilled in the art, an UNI is the physical demarcation point between a user device (e.g., a host device) and a public data network. It will further be understood by those skilled in the art that the dedicated physical connections 106 and 108 may include dedicated trunk circuits for carrying the data between the LATAs 5 and 15 and the IEC 10. It will be further understood by those skilled in the art that the dedicated connections 121 and 123 may be any of various physical communications media for communicating data such as a 56 Kbps line or a T1 line carried over a four-wire shielded cable or over a fiber optic cable. It should be understood that the dedicated physical connections 106 and 108 and the dedicated connections 121 and 123 only carry customer data originating and/or terminating at the VPN host device 112 and the VPN remote device 114. That is, no other customer data is carried over these connections.

As used in the foregoing description and the appended claims, a dedicated logical circuit is defined as a portion of the dedicated network circuit wherein data is sent over variable communication data paths or logical connections established between the first and last network devices within a LATA or IEC network and over dedicated fixed communication data paths or dedicated logical connections between LATAs (or between IECs). Thus, no matter what path the data takes within each LATA or IEC, the beginning and end of each dedicated logical connection between networks will not change. For example, the dedicated logical circuit of the dedicated network circuit in the VPN 2 may include a variable communication path within the LATA 5 and a dedicated fixed communication path (i.e., the dedicated logical connection 102) between the LATA 5 and the IEC 10. It will be understood by those skilled in the art that the dedicated logical connections 102 and 104 in the data network 2 may include dedicated network-to-network interfaces ("NNIs") between the last sending switch in a LATA and the first receiving switch in an IEC. It should further be understood that the dedicated logical connections 106 and 108 only carry customer data originating and/or terminating at the VPN host device 112 and the VPN remote device 114. That is, no other customer data is carried over these connections.

As is known to those skilled in the art, each dedicated logical circuit in a VPN may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the dedicated logical circuit as well as information relating to the destination of the data in the frame and service parameters for handling network congestion. For example, in the VPN 2 implemented as a frame relay network, the designation DLCI 100 may be used to identify the dedicated logical circuit between the host device 112 and the remote device 114. It will be appreciated that in VPNs in which dedicated logical circuit data is communicated through more than one carrier (e.g., an LEC and an IEC) the DLCI designation for the dedicated logical circuit may change in a specific carrier's network. For example, in the VPN 2, the designation DLCI 100 may identify the dedicated logical circuit in the LATA 5 and LATA 15 but the designation DLCI 800 may identify the dedicated logical circuit in the IEC 10.

Illustrative service parameters which may be included in the DLCI include a Committed Information Rate ("CIR") parameter and a Committed Burst Size ("Bc") parameter. As is known to those skilled in the art, the CIR represents the average capacity of the dedicated logical circuit and the Bc represents the maximum amount of data that may be transmitted. It will be appreciated that the dedicated logical circuit may be provisioned such that when the CIR or the Bc is exceeded, the receiving switch in the VPN will discard the frame. It should be understood that the dedicated logical circuit parameters are not limited to CIR and Bc and that other parameters known to those skilled in the art may also be provisioned, including, but not limited to, Burst Excess Size ("Be") and Committed Rate Measurement Interval ("Tc"). In ATM networks, the VPI/VCI is an address field contained in the header of each ATM data cell and contains identifying information for the logical circuit as well as information specifying a data cell's destination and specific bits which may indicate, for example, the existence of congestion in the network and a threshold for discarding cells.

It should be understood that the dedicated logical circuit in the VPN 2 may be a permanent virtual circuit ("PVC") available to the network at all times or a temporary or a switched virtual circuit ("SVC") available to the network only as long as data is being transmitted. It should be understood that the VPN 2 may further include additional switches or other interconnected network elements (not shown) creating multiple paths within each LATA and IEC for defining each PVC or SVC in the VPN. It will be appreciated that the data communicated over the dedicated logical connections 102 and 104 may be physically carried by the dedicated physical connections 106 and 108.

The VPN 2 may also include a failover network 17 for rerouting dedicated logical circuit data, according to an embodiment of the invention. The failover network 17 may include a network failover circuit including physical connections 134 and 144 and logical connections 122 and 132 for rerouting dedicated logical circuit data in the event of a failure in the network circuit between the VPN host device 112 and the VPN remote device 114. The failover network 17 will be described in greater detail in the description of FIG. 4 below. The VPN 2 may also include a network management system 175 in communication with the LATA 5, the LATA 15, and the failover network 17. The network management system 175 may be utilized to obtain status information for the dedicated logical and physical circuits between the VPN host device 112 and the VPN remote device 114. The network management system 175 may also be utilized for rerouting dedicated logical circuit data in the VPN 2 between the VPN host device 112 and the VPN remote device 114. The network management system 175 will be discussed in greater detail in the description of FIG. 3 below.

Figure 2:
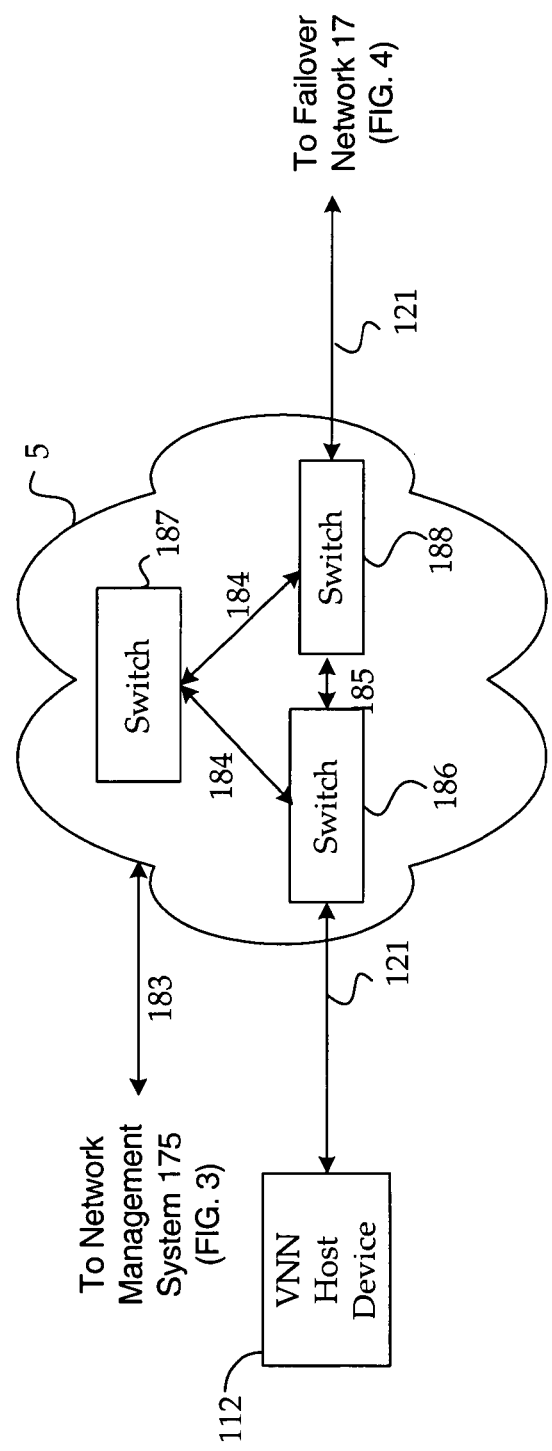
FIG. 2 illustrates a local access and transport area ("LATA") in the virtual private data network of FIG. 1, according to an embodiment of the invention.

FIG. 2 illustrates the LATA 5 in the VPN 2 described in FIG. 1 above, according to an embodiment of the present invention. As shown in FIG. 2, the LATA 5 includes interconnected network devices such as switches 186, 187, and 188. It will be appreciated that the VPN 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a dedicated logical circuit may vary between the first and last network devices in a VPN. For example, as shown in FIG. 2, the dedicated logical circuit in the LATA 5 may include the communication path 185 between the switches 186 and 188 or the communication path 184 between the switches 186, 187, and 188. As discussed above, it should be understood that the actual path taken by data through the LATA 5 is not fixed and may vary from time to time, such as when automatic rerouting takes place.

It will be appreciated that the switches 186, 187, and 188 may include a signaling mechanism for monitoring and signaling the status of the dedicated logical circuit in the VPN 2. Each time a change in the status of the dedicated logical circuit is detected (e.g., a receiving switch begins dropping frames), the switch generates an alarm or "trap" which may then be communicated to a management station, such as a logical element module (described in detail in the description of FIG. 3 below), in the network management system 175. In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, for example, the special management frames monitor the status of logical connections and provide information regarding the health of the network. In the VPN 2, the VPN host and remote devices 112 and 114 receive status information from the individual LATAs they are connected to in response to a status request sent in a special management frame or cell. The LMI status information may include, for example, whether or not the dedicated logical circuit is congested or whether or not the dedicated logical circuit has failed. It should be understood that the parameters and the signaling mechanism discussed above are optional and that other parameters and mechanisms may also be utilized to obtain connection status information for a dedicated logical circuit.

Figure 3:
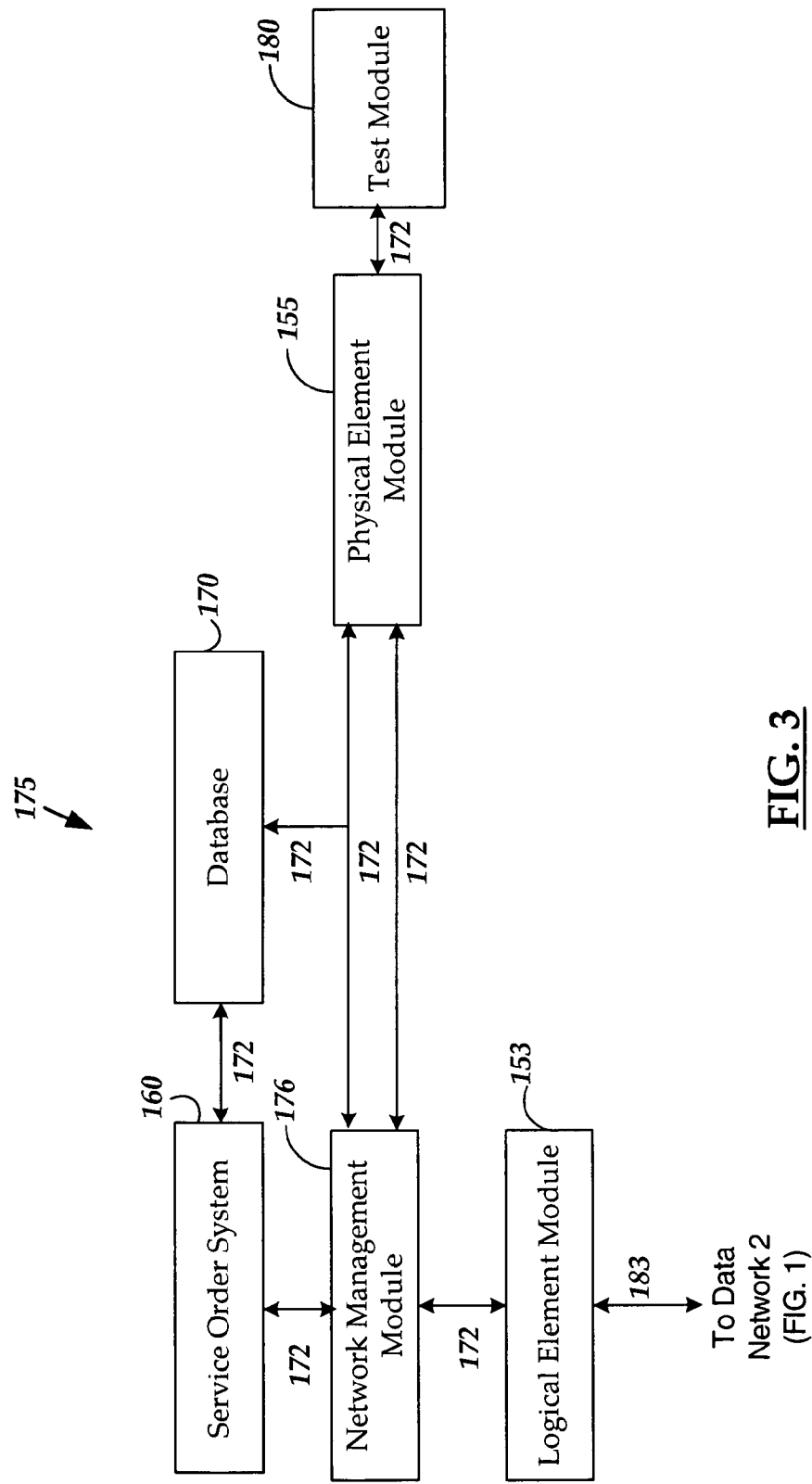
FIG. 3 illustrates a network management system which may be utilized to automatically reroute data from a failed dedicated logical circuit in a virtual private data network, according to an embodiment of the invention.

FIG. 3 illustrates the network management system 175 which may be utilized to automatically reroute data from a failed dedicated logical circuit in the VPN of FIG. 1, according to an embodiment of the invention. The network management system 175 includes a service order system 160, a network database 170, a logical element module 153, a physical element module 155, a network management module 176, and a test module 180. The service order system 160 is utilized in the VPN 2 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 172. The network database 170 assigns and stores the parameters for the VPN physical circuit portion of the VPN network circuit such as a port number on the switch 186 for transmitting data over the dedicated physical connection 121 to and from the VPN host device 112.

The network database 170 may also be in communication with an operations support system (not shown) for assigning physical equipment to the dedicated network circuit and for maintaining an inventory of the physical assignments for the dedicated network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the dedicated physical circuit.

The network management system 175 also includes the logical element module 153 which is in communication with the switches in the VPN 2 through management trunks 183. The logical element module 153 runs a network management application program to monitor the operation of logical circuits which includes receiving trap data generated by the switches which indicate the status of logical connections. The trap data may be stored in the logical element module 153 for later analysis and review. The logical element module 153 is also in communication with the network database 170 via management trunks 172 for accessing information regarding logical circuits such as the logical identifier data. The logical identifier data may include, for example, the DLCI or VPI/VCI header information for each data frame or cell in the logical circuit including the circuit's destination and service parameters. The logical element module 153 may consist of terminals (not shown) that display a map-based graphical user interface ("GUI") of the logical connections in the data network. An illustrative logical element module is the NAVIS-CORE™ system marketed by LUCENT TECHNOLOGIES, Inc. of Murray Hill, N.J.

The network management system 175 further includes the physical element module 155 in communication with the dedicated physical connections of the dedicated network circuit via management trunks (not shown). The physical element module 155 runs a network management application program to monitor the operation and retrieve data regarding the operation of the dedicated physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the dedicated physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The network management system 175 further includes the network management module 176 which is in communication with the service order system 160, the network database 170, the logical element module 153, and the physical element module 155 through communications channels 172. It should be understood that in one embodiment, the network management system 175 may also be in communication with the LATA 15, the IEC 10, and the failover network 17. The communications channels 172 may be on a LAN. The network management module 176 may consist of terminals (not shown), which may be part of a general-purpose computer system that displays a map-based GUI of the logical connections in data networks. The network management module 176 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses. The network management module 176 may also serve as an interface for implementing logical operations to provision and maintain network circuits. The logical operations may be implemented as machine instructions stored locally or as instructions retrieved from the logical and physical element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this patent, which is expressly incorporated herein by reference. An illustrative network management module is the Broadband Network Management System® ("BBNMS") marketed by TELECORDIA™ TECHNOLOGIES, Inc. of Morristown, N.J.

Figure 4:
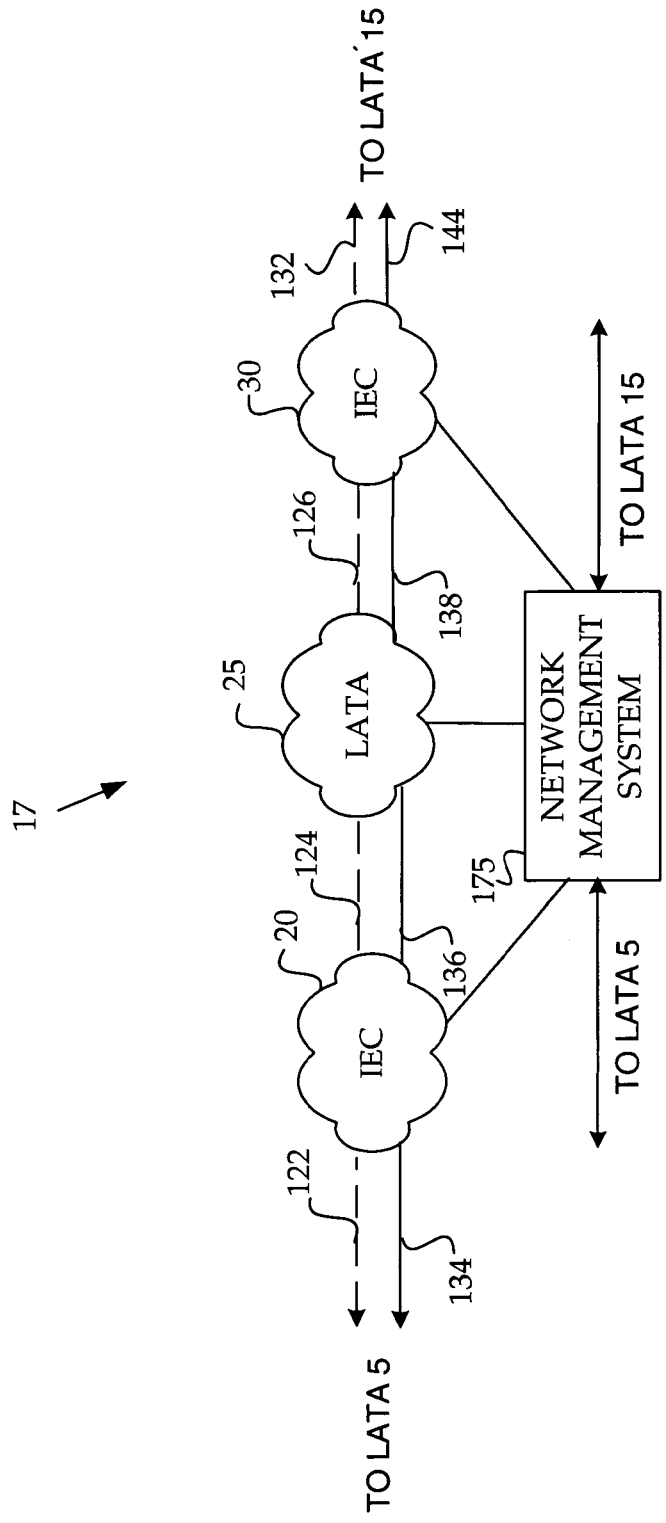
FIG. 4 illustrates a failover data network for rerouting dedicated logical circuit data from a virtual private data network, according to an embodiment of the invention.

FIG. 4 illustrates a failover data network for rerouting dedicated logical circuit data, according to one embodiment of the present invention. As shown in FIG. 4, the failover network 17 includes an IEC 20, a LATA 25, and an IEC 30. The failover network further includes a network failover circuit which includes a physical failover circuit and a logical failover circuit. The physical failover circuit includes the physical connection 134 between the LATA 5 (shown in FIG. 1) and the IEC 20, the physical connection 136 between the IEC 20 and the LATA 25, the physical connection 138 between the LATA 25 and the IEC 30, and the physical connection 144 between the IEC 30 and the LATA 15 (shown in FIG. 1). Similarly, the logical failover circuit may include the logical connection 122 between the LATA 5 (shown in FIG. 1) and the IEC 20, the logical connection 124 between the IEC 20 and the LATA 25, the logical connection 126 between the LATA 25 and the IEC 30, and the logical connection 132 between the IEC 30 and the LATA 15 (shown in FIG. 1). It should be understood that in one embodiment, the network failover circuit illustrated in the failover network 17 may include a dedicated physical circuit and a dedicated logical circuit provisioned by a network service provider serving the LATAs 5, 15, and 25 and the IECs 20 and 30, for rerouting logical data from a failed logical circuit.

Figure 5:
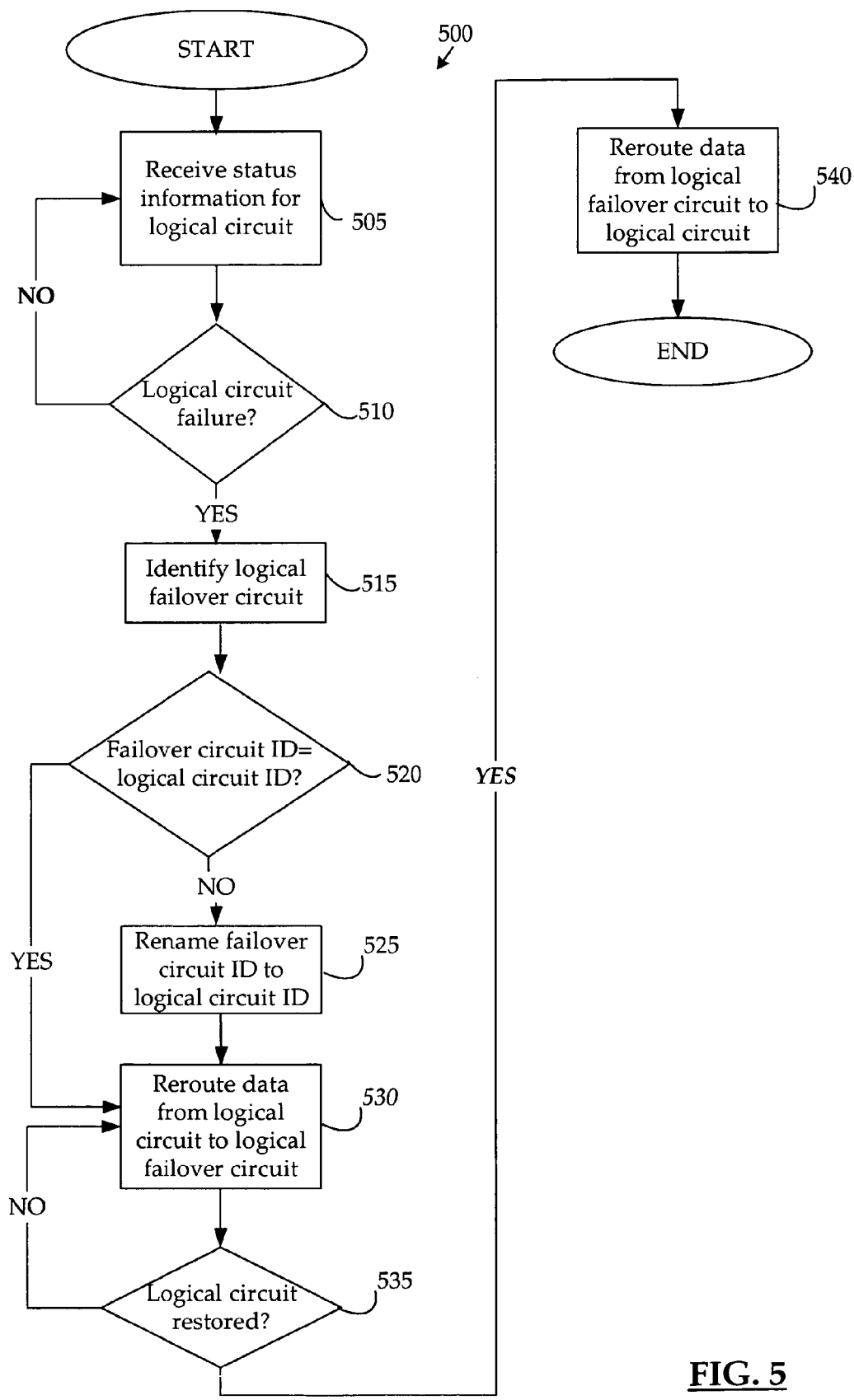
FIG. 5 illustrates a flowchart describing logical operations for automatically rerouting data from a failed dedicated logical circuit in a virtual private data network, according to an embodiment of the invention.

FIG. 5 illustrates a flowchart describing logical operations 500 for automatically rerouting dedicated logical circuit data in a VPN, according to an embodiment of the invention. The logical operations 500 begin at operation 505 where the network management module 176 receives status information for a logical circuit in the data network 2. It will be appreciated that in one embodiment, the status information may be received by communicating with the logical element module 153 to request trap data generated by one or more switches in the data network which indicate the status of one or more logical connections making up the logical circuit. It will be appreciated that in one embodiment of the present invention, the network management module 176 may be configured to automatically monitor the dedicated logical circuits in the VPN 2 for trap data to identify a dedicated logical circuit failure. An illustrative method detailing the automatic monitoring of logical circuits to identify a logical circuit failure in a data network is presented in co-pending U.S. patent application Ser. No. 10/745,170, entitled "Method And System For Automatically Identifying A Logical Circuit Failure In A Data Network," filed on Dec. 23, 2003, and assigned to the same assignee as this patent, which is expressly incorporated herein by reference.

After receiving the status information for the dedicated logical circuit at operation 505, the logical operations 500 continue at operation 510 where the network management module 176 determines whether a dedicated logical circuit failure has occurred based on the received status information. It should be understood that a dedicated logical circuit failure occurs when one or more dedicated logical connections in a dedicated logical circuit have failed. As discussed above in the description of FIG. 2, trap data indicating a logical connection failure may include status information indicating that a switch in the data network is discarding frames or cells. Such an event may occur, for example, when the maximum CIR or Bc (as specified in the DLCI of a frame in a frame relay network, for example) is exceeded. For example, in the VPN 2 shown in FIG. 1, the "X" marking the dedicated logical connections 102 and 104 indicate that both connections are "down beyond" (i.e., not communicating data) the portion of the dedicated logical circuit in the LATA data networks 5 and 15. In this example, such a condition may indicate that the dedicated logical circuit failure lies in the IEC data network 10.

If at operation 510, it is determined that a dedicated logical circuit failure has not occurred, the logical operations 500 then return to operation 505 where the network management module 176 again receives status information for the dedicated logical circuit. If, however, at operation 510 it is determined that a dedicated logical circuit failure has occurred, the logical operations continue to operation 515. At operation 515, the network management module 176 identifies a logical failover circuit for rerouting the data from the dedicated logical circuit in the VPN. For example, if as shown in FIG. 1, it is determined that the dedicated logical circuit failure in the VPN 2 has been isolated to the IEC data network 10, a logical failover circuit in the failover network 17 may be selected to reroute the data such that it bypasses the IEC data network 10. For example, the logical failover circuit may be selected including the logical connections 122, 124, 126, and 132 (as shown in FIG. 4) to reroute the data from the VPN host device 112, through the LATA 5, the IEC 20, the LATA 25, the IEC 30, the LATA 15, and finally to the VPN remote device 114.

It will be appreciated that in one embodiment, the logical failover circuit selected may be a dedicated circuit which is only utilized for rerouting logical data from a failed logical circuit (i.e., the failover circuit does not normally communicate data traffic). In another embodiment, the logical failover circuit may be another dedicated logical circuit which is normally utilized for communicating data traffic in the VPN. In this embodiment, the selection of the logical failover circuit may also include determining whether one or more dedicated logical connections in the circuit are currently communicating data traffic or are currently unused. If currently unused, the dedicated logical connections may be selected for rerouting logical data. In still another embodiment, the logical failover circuit may be a currently unused non-dedicated logical circuit (i.e., not restricted to carrying VPN customer traffic) in a public data network.

It should be understood that in one embodiment, the selection of the logical failover circuit may be manually initiated. For example, a technician at the logical element module 153 or the network management module 176 may utilize a map-based GUI displaying the dedicated logical connections in the LATA data networks 5 and 15 and their status. A dedicated logical failover circuit (or a currently unused logical circuit with available logical connections) may then be selected as a logical failover circuit for communicating data from a failed dedicated logical circuit. The logical operations 500 then continue from operation 515 to operation 520.

As discussed above, the dedicated logical circuits in a VPN are identified by a logical circuit identifier (ID). At operation 520, the network management module 176 compares the identifier (e.g., the DLCI or VPI/VCI) of the dedicated logical circuit to the identifier of the selected logical failover circuit. If at operation 520, it is determined that the identifiers of the failed dedicated logical circuit and the logical failover circuit are the same, the logical operations 500 then continue from operation 520 to operation 530. If, however, at operation 520 it is determined that logical circuit identifiers of the failed dedicated logical circuit and the logical failover circuit are not the same, the logical operations 500 then continue from operation 520 to operation 525 where the network management module 176 renames the logical circuit ID of the failed dedicated logical circuit to the ID of the logical failover circuit in the database 170. The logical operations 500 then continue from operation 525 to operation 530.

It will be appreciated that in the failover network 17, a dedicated failover logical circuit may be assigned to an existing dedicated logical circuit in a VPN and identified with the same ID as the existing dedicated logical circuit. However, a logical failover circuit which is already an existing logical circuit (i.e., normally communicates data traffic in a data network) is already assigned a unique logical circuit ID. Thus, in the presently described embodiment of the invention, the logical identifier of a failed dedicated logical circuit may be renamed so that it is in accord with a current logical identifier of a logical failover circuit. For example, in a frame relay VPN, a dedicated logical circuit may be identified as DLCI 100 while a logical failover circuit may be identified as DLCI 250. The dedicated logical circuit may be renamed from DLCI 100 to DLCI 250. It will further be appreciated that the network management module 176 may store the changes to logical circuit identifiers as reroute data in the database 170. This reroute data may then be accessed to rename the logical identifier of the failed dedicated logical circuit once the trouble in the failed dedicated logical circuit has been repaired.

At operation 530 the network management module 176 reroutes the data from the failed dedicated logical circuit to the logical failover circuit. It will be appreciated that the reroute of the data may be accomplished from the logical management module 153 or the network management module 176 which, in communication with the switches in the VPN 2 (and the failover network 17), sends instructions to reroute the data from the dedicated NNIs or logical connections 102 and 104 to the failover NNIs or logical connections 122, 124, 126, and 132 in the logical failover circuit. The logical operations 500 then continue from operation 530 to operation 535.

At operation 535, the network management module 176 determines whether the failed dedicated logical circuit has been restored. This determination may be made, for example, by continuous or periodic logical circuit monitoring of the link status of the failed dedicated logical circuit, which may be performed by the logical element module 153 in communication with the network management module 176, to establish that the logical connections 102 (at the LATA 5) and 104 (at the LATA 15) are successfully communicating data. If at operation 535 it is determined that the failed dedicated logical circuit has not been restored, the logical operations 500 return to operation 530 where the rerouting of the data is maintained on the logical failover circuit. If however, at operation 535, it is determined that the failed dedicated logical circuit has been restored, then the logical operations 535 continue to operation 540 where the data on the logical failover circuit is rerouted back to the restored dedicated logical circuit. Similar to the rerouting of the data onto the logical failover circuit, the rerouting of the data back onto the restored dedicated logical circuit may be accomplished from the network management module 176 which, in communication with the switches in the VPN 2 (and the failover network 17), sends instructions to reroute the data from the failover NNIs or logical connections 122, 124, 126, and 132 to the restored dedicated NNIs or logical connections 102 and 104 in the VPN 2. The logical operations 500 then end.

It will be appreciated that in one embodiment the logical circuit failover procedure may be initiated as part of a customer subscription service offered by the VPN service provider. The subscription service may include use of the logical failover circuit for a predetermined time period after the VPN customer's data has been rerouted. For example, a VPN customer subscribing to the failover service would automatically have the logical circuit failover procedure initiated and the customer's data would be rerouted for up to two hours over the logical failover circuit after a determination that the customer's VPN network circuit has failed. If a VPN customer is not a subscriber, the failover service may still be initiated and the customer may be billed based on the length of time the failover service was in service. In another embodiment, the VPN customer may be offered the failover service by the service provider in real-time (i.e., upon determining a VPN network circuit failure).

It will be appreciated that the embodiments of the invention described above provide for a method and system for automatically rerouting data from failed logical circuits in a VPN. A dedicated logical circuit in the VPN is monitored for status information indicating a failure. When a failure in the dedicated logical circuit is detected, the data in the circuit may be rerouted to a "logical failover network," thereby minimizing lost data until the trouble in the logical circuit is resolved. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of automatically rerouting logical circuit data, the method comprising:

selecting a logical failover circuit comprising an alternate communication path for communicating data upon a failure of a dedicated logical circuit connecting a host device to a remote device to communicate the data to originate and terminate at the host device and the remote device;
when a first logical circuit identifier of the dedicated logical circuit does not match a second logical circuit identifier of the logical failover circuit:
renaming the second logical circuit identifier of the logical failover circuit to identify the logical failover circuit using the first logical circuit identifier of the dedicated logical circuit when the logical failover circuit is a dedicated logical failover circuit used to communicate only when the dedicated logical circuit fails, and
renaming the dedicated logical circuit to identify the dedicated logical circuit using the second logical circuit identifier of the logical failover circuit when the logical failover circuit is used to communicate regardless of the failure of the dedicated logical circuit; and
rerouting the data to the logical failover circuit without manual intervention.

2. The method of claim 1, wherein the dedicated logical circuit is in a multiprotocol label switching standard network.

3. The method of claim 1, further comprising making a real-time offer to a customer of the dedicated logical circuit after identifying the failure of the dedicated logical circuit and before rerouting the data, the real-time offer being to reroute the data.

4. The method of claim 1, wherein the dedicated logical circuit traverses a first local access and transport area, a first inter-exchange carrier, and a second local access and transport area.

5. The method of claim 4, wherein the logical failover circuit traverses a second inter-exchange carrier, a third local access and transport area, a third inter-exchange carrier, and the second local access and transport area, wherein rerouting the data to the logical failover circuit comprises rerouting the data via the second inter-exchange carrier, the third local access and transport area, and the third inter-exchange carrier to bypass the first inter-exchange carrier.

6. The method of claim 4, further comprising identifying the failure of the dedicated logical circuit via a network management system in communication with the first and second local access and transport areas via management trunks and separate from switches of the dedicated logical circuit used to communicate the data.

7. The method of claim 1, wherein the first and second logical circuit identifiers are at least one of virtual path identifiers or virtual circuit identifiers.

8. A system to automatically reroute logical circuit data, the system comprising:
a database to store a first logical circuit identifier of a dedicated logical circuit in a packet-based network and a second logical circuit identifier of a logical failover circuit; and
a network management module having a processor, and a memory storing instructions executable by the processor to perform operations comprising:
selecting the logical failover circuit comprising an alternate communication path for communicating data upon a failure of the dedicated logical circuit connecting a host device to a remote device to communicate the data to originate and terminate at the host device and the remote device;
when the first logical circuit identifier of the dedicated logical circuit does not match the second logical circuit identifier:
renaming the logical failover circuit to identify the logical failover circuit using the first logical circuit identifier of the dedicated logical circuit when the logical failover circuit is a dedicated logical failover circuit used to communicate only when the dedicated logical circuit fails, and
renaming the dedicated logical circuit to identify the dedicated logical circuit using the second logical circuit identifier of the logical failover circuit when the logical failover circuit is used to communicate regardless of the failure of the dedicated logical circuit; and
rerouting the data to the logical failover circuit without manual intervention.

9. The system of claim 8, wherein the dedicated logical circuit is in a multiprotocol label switching standard network.

10. The system of claim 8, wherein the operations further comprise, upon identifying the failure of the dedicated logical circuit and prior to rerouting the data, making a real-time offer to a customer of the dedicated logical circuit to reroute the data.

11. The system of claim 8, wherein the dedicated logical circuit traverses a first local access and transport area, a first inter-exchange carrier, and a second local access and transport area.

12. The system of claim 11, wherein the logical failover circuit traverses a second inter-exchange carrier, a third local access and transport area, a third inter-exchange carrier, and the second local access and transport area, wherein the network management module is to reroute the data to the logical failover circuit to reroute the data via the second inter-exchange carrier, the third local access and transport area, and the third inter-exchange carrier to bypass the first inter-exchange carrier.

13. The system of claim 11, further comprising a logical element module in communication with the first and second local access and transport areas via management trunks and separate from switches of the dedicated logical circuit used to communicate the data, the logical element module to store status information generated by the switches, wherein the network management module is further to request the status information from the logical element module and to identify the failure of the dedicated logical circuit based on the status information.

14. The system of claim 8, wherein the first and second logical circuit identifiers are at least one of virtual path identifiers or virtual circuit identifiers.

15. A tangible computer readable storage device or storage disc having instructions stored thereon that, when executed, cause a machine to perform a method comprising:
selecting a logical failover circuit comprising an alternate communication path for communicating data upon a failure of a dedicated logical circuit connecting a host device to a remote device to communicate the data to originate and terminate at the host device and the remote device;
when the first logical circuit identifier of the dedicated logical circuit does not match a second logical circuit identifier of the logical failover circuit:
changing the second logical circuit identifier of the logical failover circuit to identify the logical failover circuit using the first logical circuit identifier of the dedicated logical circuit when the logical failover circuit is a dedicated logical failover circuit used to communicate only when the dedicated logical circuit fails, and
changing the first logical circuit identifier of the dedicated logical circuit to identify the dedicated logical circuit using the second logical circuit identifier of the logical failover circuit when the logical failover circuit is used to communicate regardless of the failure of the dedicated logical circuit; and rerouting the data to the logical failover circuit without manual intervention.

16. The tangible computer readable storage device or storage disc of claim 15, wherein the dedicated logical circuit is in a multiprotocol label switching standard network.

17. The tangible computer readable storage device or storage disc of claim 15, wherein the method further comprises, upon identifying the failure of the dedicated logical circuit and prior to rerouting the data, making a real-time offer to a customer of the dedicated logical circuit to reroute the data.

18. The tangible computer readable storage device or storage disc of claim 15, wherein the dedicated logical circuit traverses a first local access and transport area, a first inter-exchange carrier, and a second local access and transport area.

19. The tangible computer readable storage device or storage disc of claim 18, wherein the logical failover circuit traverses a second inter-exchange carrier, a third local access and transport area, a third inter-exchange carrier, and the second local access and transport area, and wherein instructions stored on the computer readable medium, when executed, cause the machine to reroute the data to the second inter-exchange carrier, the third local access and transport area, and the third inter-exchange carrier to bypass the first inter-exchange carrier.

20. The tangible computer readable storage device or storage disc of claim 18, wherein the method further comprises identifying the failure via a network management system in communication with the first and second local access and transport areas via management trunks and separate from switches of the dedicated logical circuit used to communicate the data.

* * * * *